United States Patent

[11] 3,549,110

| [72] | Inventor | Robert B. Cotton<br>Media, Pa. |
|---|---|---|
| [21] | Appl. No. | 756,035 |
| [22] | Filed | Aug. 28, 1968 |
| [45] | Patented | Dec. 22, 1970 |
| [73] | Assignee | All American Engineering Company<br>Wilmington, Del.<br>a corporation of Delaware |

[54] ENERGY ABSORBER
20 Claims, 12 Drawing Figs.

| [52] | U.S. Cl. | 244/110,<br>188/90, 188/92; 418/61 |
|---|---|---|
| [51] | Int. Cl. | B64f 1/02 |
| [50] | Field of Search | 244/110,<br>63; 188/89, 90, 92; 103/130; 230/145 |

[56] References Cited
UNITED STATES PATENTS

| 2,967,683 | 1/1961 | Crater | 244/110 |
| 3,305,195 | 2/1967 | Eickmann | 244/110X |
| 3,459,393 | 8/1969 | Thomas | 244/110X |

Primary Examiner—Milton Buchler
Assistant Examiner—Paul E. Sauberer
Attorney—Connolly and Hutz ABSTRACT: An energy absorbing device, which is highly effective for use in an aircraft arresting gear, is provided by mounting a rotary pump having a pressure related characteristic within a container of fluid. The pump circulates the fluid from and back into the container whereby it absorbs energy in response to a mechanical input and transmits this energy to the fluid in the container in the form of heat. A highly effective form of this device utilizes a rotary piston-type pump having an axial input channel in its shaft connected to radial passageways extending through its cam disc and rotating piston. The fluid is discharged through pressure relief valves of the compressed air cushioned type. The rotary piston-type pump is particularly advantageous for such service because its rotor rotates slower than the input shaft, thus minimizing the mass of the pump to provide a given amount of energy absorption.

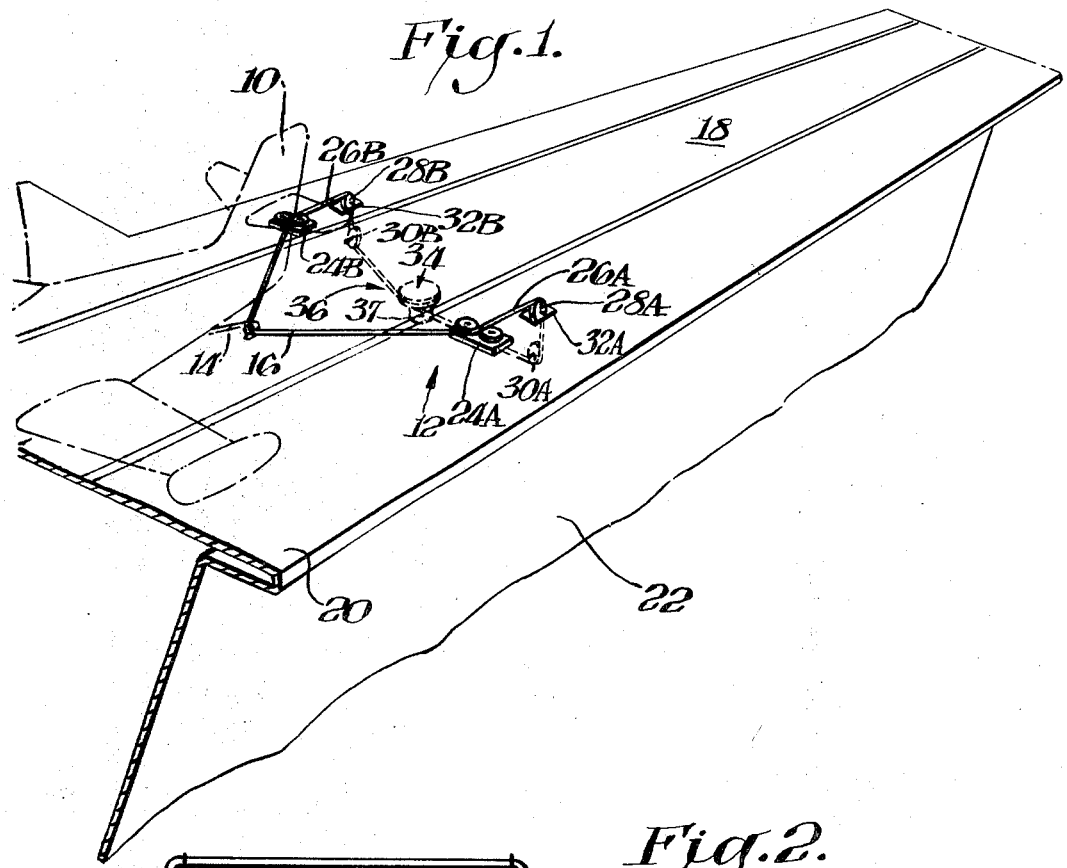

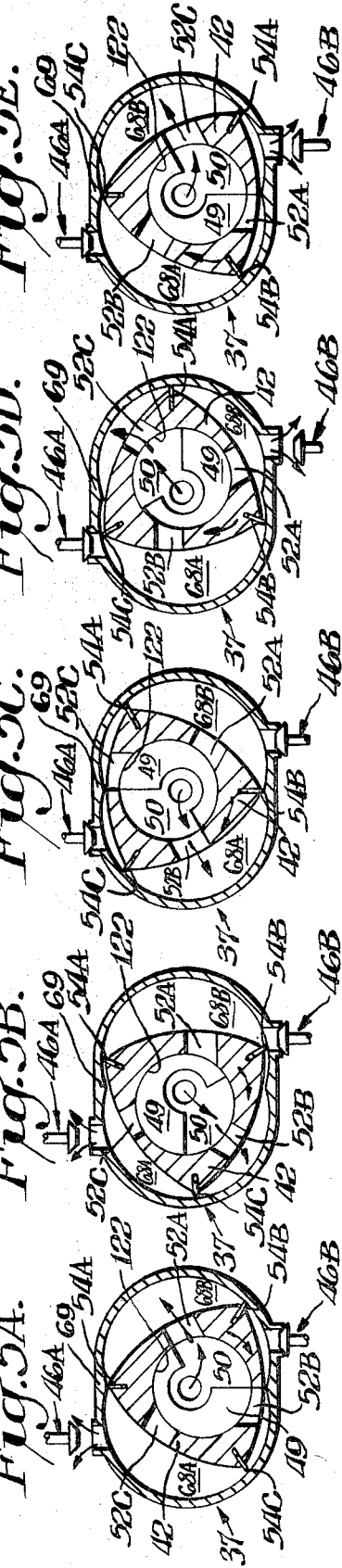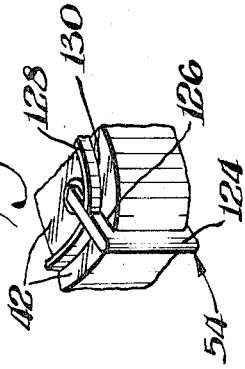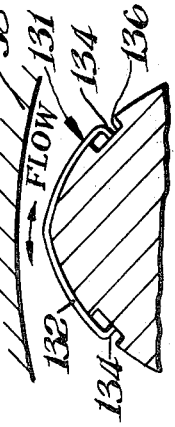

ENERGY ABSORBER

BACKGROUND OF THE INVENTION

1. Field of the Invention

This invention relates to an energy absorbing device for aircraft arresting gear and a unique pump which is particularly useful therein.

2. Description of the Prior Art.

Various fluid-operated devices have been used for absorbing energy in aircraft arresting gear. Most of such energy absorbing devices develop torque as a function of velocity which enhances their energy-absorbing capacity. Their velocity-responsive nature, however, does not allow for sufficient torque control to obtain an efficient deceleration curve during the arrest, particularly for a wide range of airplane weights and airplane engaging velocities. Hydraulic pumps having pressure related characteristics have been proposed for such use, but no preexisting pump arrangements have had sufficient capacity to absorb the peak energy required to arrest modern high speed aircraft. See British Pat. No. 287,189 (1928).

SUMMARY

This invention utilizes several novel features which are useful both independently and in combination. An efficient energy absorbing device is provided by mounting a rugged rotary pump having a pressure related characteristic within the interior of a substantially large container of fluid. The fluid is circulated from the container through the pump and back into the container in response to rotation of the pump. This absorbs considerable mechanical input energy transmitted by the pump to the substantial body of fluid in the container in the form of heat. Recirculation of the fluid within the container makes it possible for a limited amount of fluid to absorb considerable energy.

A rotary piston pump is particularly effective for such service because of its simplicity and step down ratio between rotor and input shaft speeds. This minimizes the mass of the pump necessary to provide a given amount of energy absorption. Such a pump (which is also independently useful) advantageously includes pressure relief-type or program actuated outlet valves and an inlet flow system including a hollow cam shaft having radial ports in the cam disc and triangular piston. Sealing means of variable effectiveness may be provided between the triangular rotary piston and the walls of the epitrochoidal housing within which it rotates to bypass, minimize resistance of the pump at higher speeds of operation and to reduce the back pressure in the container required to prevent cavitation of the pump.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a perspective view of one embodiment of this invention being used in an aircraft arresting gear;

FIG. 2 is a schematic diagram of the energy absorber shown in FIG. 1;

FIGS. 5A—5E are schematic cross-sectional views taken through the housing of the energy absorber shown in FIGS. 2—4 illustrating the cycle of operation of the inlet and outlet valves;

FIG. 6 is a perspective view of edge and side sealing means for the rotary piston of the energy absorber shown in FIGS. 2—5; and FIGS. 7A and 7B are schematic diagrams showing operation of an optional form of sealing means for bypassing fluid during high speed operation.

DESCRIPTION OF THE PREFERRED EMBODIMENTS

Figure 3:
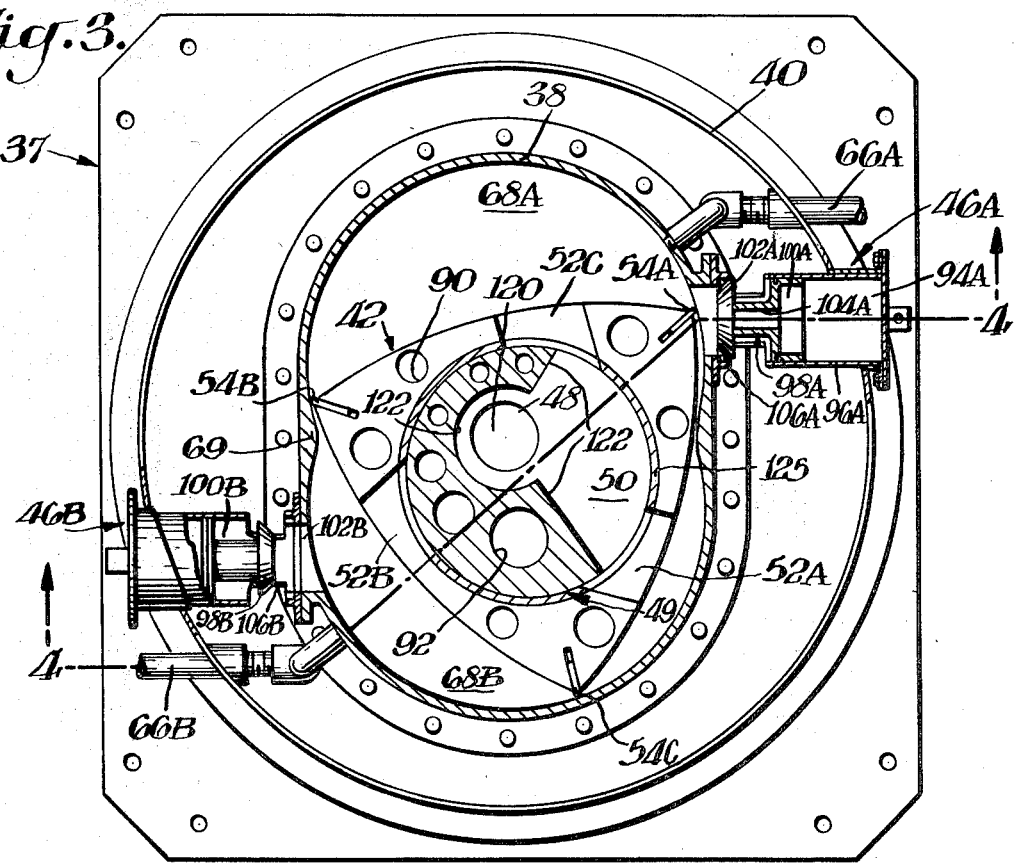
FIG. 3 is a bottom cross-sectional plan view taken through the energy absorber shown in FIGS. 1 and 2 and through FIG. 4 along the line 3–3.

In FIG. 1 is shown an airplane 10 being arrested by aircraft arresting gear 12 engaged in hook 14 extending from below the tail of aircraft 10. Aircraft arresting gear 12, for example, includes a deck pendant or cable 16 extending across runway 18 on flight deck 20 of naval aircraft carrier 22. Each end of pendant 16 extends through sheave blocks 24 A and B mounted on each side of runway 18 and connected to long lengths of payout line, such as steel cable 26, which extend over pulleys 28A and B, 30A and B and through deck apertures 32A and B to below-deck linear storage and payout device 34. Device 34 is for example of the type utilizing steel cable as described in copending application Ser. No. 632,289 filed Apr. 20, 1967, now U.S. Pat. No. 3,467,347 by this same inventor. Linear storage and payout device 34 may be of any effective type, such as a simple reel of nylon tape, for example as described in U.S. Pat. No. 3,172,625. The cable or nylon (which may be referred to as a linear payout element) and the storage device are mounted above and connected to energy absorber 37 of system 36.

Figure 4:
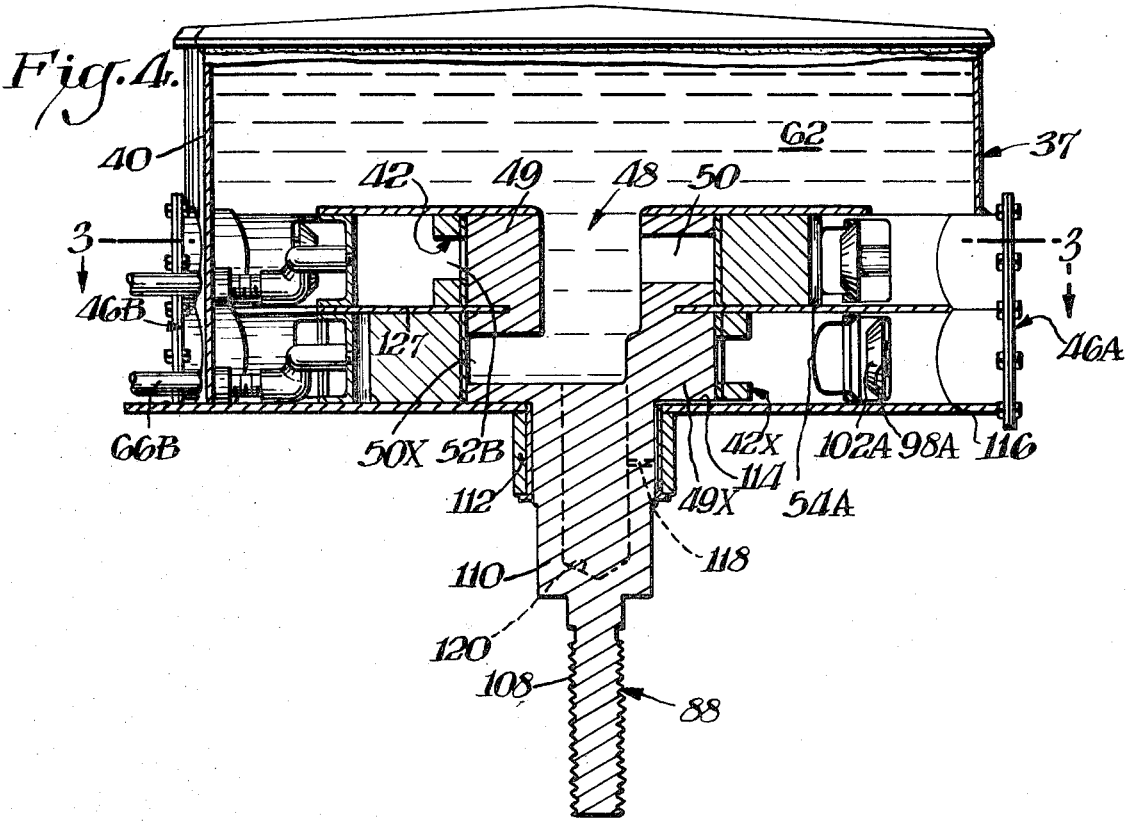
FIG. 4 is a cross-sectional view taken through FIG. 3 along the line 4–4.

FIGS. 2—4 show energy absorbing system 36 including rotary piston-type pump 38 mounted within a container 40 of a substantial amount of fluid, such as ethylene glycol and water.

Rotary piston-type pump 38 is an adaptation of the rotary piston engine commonly referred to as the Wankel engine. This engine is described in various publications including: "The Way the Things Work" published by Simon and Schuster, New York, Second Printing, Library of Congress Catalog Card No. 67—27972; Paper 886d, presented Aug. 1964 at the S.A.E. National West Coast Meeting, entitled "The Curtiss-Wright Rotating Combustion Engines Today" by Charles Jones, Wright Aeronautical Division, Curtiss-Wright Corp. an article in the Apr. 1966 issue of Popular Science Magazine, pages 98—107 entitled "The Engine That's Giving Detroit Wankel Fever" by Devon Francis and U.S. Pat. No. 3,391,677.

Pump 38 as shown herein differs in many respects from the Wankel rotary piston engine but similar terminology is employed herein for similar features. Pump 38 may also be any rugged and dependable rotary pump having a pressure related characteristic, such as a gear or lobed pump. The rotary piston pump illustrated herein is particularly advantageous because of its relatively low mass relative to energy absorbing capability by virtue of the slower rotation of its rotor relative to input shaft speed for reasons later explained in detail.

Pump 38 includes triangular piston 42 rotating within housing 44 having an epitrochoidal cross section, presenting an oval-shape slightly constricted in the middle. A pair of outlet valves 46 A and B discharge fluid during discharge phases of operation into container or tub 40. Fluid is introduced to pump 38 through: axial inlet channel 48 and cutout sector 50 in rotary cam 49 and through radial ports 52 in triangular piston 42. The space between triangular piston 42 and the inside of housing 44 is sealed by resilient wipers 54 A, B and C of the type described on page 106 of the aforementioned "Popular Science" article. Wipers 54 A, B and C are generally referred to as wipers 54.

Pressure accumulator system 56 is provided for energizing the retrieval of cables 26 A and B and for tensioning pendant 16 after retrieval. System 56 includes pressure storage cylinder 58 with free piston 60 separating hydraulic fluid 62 from compressed air 64. The pressure supply to cylinder 58 is provided through pipe lines 66 A and B connected to chamber 68A and 68B of pump housing 44. Lines 66A and 66B merge into a single pipe line 70 connected to pressure cylinder 58 through check valve 72.

Retrieve motor 74 is supplied through pipe 76 connected to pressure cylinder 58 through control valve 78. Retrieve motor 74 is connected to linear storage and payout device 34, for example through a sprocket and chain assembly 80. Since linear storage and payout system 34 might not be capable of withstanding the force of pendant tensioning, tensioning control device 82 is provided to bypass check valve 72. This permits pressure to be directed from cylinder 58 into pump chambers 68A and B in the reverse direction, thus applying a very slight reverse displacement to pump 38, which is on the output or capstan side of the linear storage and payout system. This permits the linear payout elements and runway pendant to be tensioned without unduly stressing the storage and payout system. This is particularly important in the cable storage and payout system described in the aforementioned copending patent application Ser. No. 632,289, filed Apr. 20, 1967, by this same inventor. Makeup fluid for pressure cylinder 58 is stored in gravity tank 84 and adequate pressure in the system may be verified through pressure gauge 86.

In FIGS. 3 and 4 are shown details of energy absorbing device 37. FIG. 3 is a plan view looking upwardly through a broken away portion of energy absorber 37 when installed in the position shown in FIG. 1. FIG. 4 is a cross-sectional view taken through FIG. 3, illustrating energy absorber 37 inverted from the position shown in FIG. 1 to facilitate illustration of the working parts. FIG. 4 therefore shows shaft 88 pointing downwardly instead of upwardly as it is actually installed in FIG. 1.

Energy absorber 37 in FIGS. 3 and 4 includes a pair of rotary pistons 42 and 42X to eliminate the need for a counter weight. Piston 42 is lighter than piston 42X by virtue of lightening holes 90 in piston 42 to provide dynamic balance with respect to shaft 88. Rotary cam means 49 is also made lighter than rotary cam 49X by holes 92 in rotary cam 49 for the same purpose. Bearing 125 of bronze material is disposed peripherally between cam 49, 49X and rotary piston 42 and 42X. Also the rotary pistons are laterally separated by a partition wall 127 thereby forming two separate chambers.

As shown in FIG. 3, output valves 46A and B are of the pressure relief type and more particularly of the compressible fluid-actuated type, operated for example by compressed air trapped in chambers 94 within cylinders 96A and B. Valving assemblies 98A and B include pistons 100A and B connected to valve discs 102A and B through stems 104A and B. Pistons 100A and B force valve discs 102A and B against seats 106A and B when the pressure in corresponding chambers is below a predetermined minimum pressure. The operating pressure may be varied by adjusting the pressure of compressed air in chambers 94A and B and this pressure may be programmed during portions of the cycle of operation if desired by a pressure varying arrangement not shown.

The following description directed to piston 42 applies also to piston 42X. Piston 42 is rotated in response to an input from shaft 88. Shaft 88 includes threads 108 for attachment to a linear storage and payout system. Enlarged portion 110 of shaft 88 is received within bearing 112, which is for example a journal bearing. Pressure for journal bearing 112 is obtained from pump chambers 68A and B through space 114 between rotary piston 42X and adjacent plate 116 of container or cylinder 40. Pressure from bearing 112 is discharged through small hole 118 extending into axial cavity 120 within shaft 88.

Inlet fluid 62 to pump 38 from container 40 is conducted through inlet passageway 48 and sector 50 within cam disc 49 whose sides 122 form an approximate 120° angle. The base of cutout sector 50 is a portion of a circle 122 as shown in FIG. 3 to provide adequate flow through to inner cam disc 49X. The cyclical phase of walls 122 of section 50 relative to ports 52A, B AND C through piston 42 directs inlet fluid during proper portions of the cycle into chambers 68A and B when they are not under compression. In FIG. 2 chamber 68A is under compression, which lifts valve disc 102A off its seat and discharges fluid through valve 46A. Valve 46B is closed because chamber 68B is not under compression and fluid is entering it through opened port 52A. Pressure is maintained by wiping seals 54, which are later described in detail in conjunction with FIGS. 6, 7A and 7B.

The phases of operation of rotary piston pump or energy absorber 37 are shown in FIGS. 5A through E, which illustrate the events occurring during one rotation of input shaft 88. During this single rotation of shaft 88, cam disc 49 engaged within piston 42 makes one revolution and piston 42 rotates one-third of a revolution. This rotation is effected by the described cam action of disc 49 rotating within circular hole 125 in piston 42. Immersion of the piston 42 and cam 49 within fluid 62 adequately lubricates relative rotation without undue wear and obviates the need for gearing between the cam and piston. Such gearing might, however, be utilized in the same manner as it is utilized in combustion engine versions of the Wankel engine.

In FIG. 5A the blank portion of 49 is opposite port 52C. Chamber 68A is therefore sealed, thus causing rotation of piston 42 to compress the fluid therein and creating a pressure which moves valve 46A off its seat to discharge into container 40. At the same time sector 50 is connected to port 52A which allows inlet fluid from container 40 to enter into chamber 68B. Valve 46B is closed because there is not enough pressure to open it. Outer seal 54A wipes in contact with the pinch 69 between chamber 68A and 68B in FIG. 5A.

In FIG. 5B piston 42 has rotated slightly clockwise, but substantially the same flow conditions exist, with valve 46A being open and valve 46B being closed. There is one difference, however, in that sector 50 is no longer connected with valve port 52A but with valve port 52B to allow fluid to enter the lower portion of chamber 68A.

In FIG. 5C fluid is still entering chamber 68A through aligned sector 50 and port 52B, but the pressure has as yet not been built up sufficiently in chamber 68B to open discharge valve 46B.

In FIG. 5D the pressure in chamber 68B has been built up sufficiently to open discharge valve 46B and the arrows through it indicate the direction of flow. Sector 50 is no longer communicating with valve port 52B into chamber 68A, but with valve port 52C behind wiping seal 54A to allow fluid to flow into the portion of chamber 68B behind it.

In FIG. 5E valve 46B is still open between the seals effected by wipers 54A and 54B plus discharging pressure through valve 46B while fluid is entering chamber 68B behind seal 54A through sector 50 and connecting port 52C. One revolution of shaft 88 has therefore rotated triangular piston 42 through one-third of a revolution. This provides a significant mechanical advantage and minimizes the mass of pump 38 to provide a given amount of energy absorption. The energy absorbed is given up in the form of heat into the body of fluid 62 within tub 40. Energy absorber 37 is particularly effective with the illustrated rotary piston-type of pump but an effective energy absorber may be provided by any rugged positive flow rotary pump such as a gear pump or a lobed pump.

FIG. 6 shows a form of wiping seal 54 including a spring urged wiping feeler 124 within a radial slot 126 in a vertex of piston 42. An end seal is provided by resilient strip 128 in peripheral end slot 130. These seals are, for example, of the type described in the aforementioned literature and patents relating to the Wankel type of internal combustion engine.

FIGS. 7A and 7B show a modified form of seal 131 having variable effectiveness in accordance with the internal pressure within housing 38. Seals 131 include a spring bow 132 of relatively large area having ends 134 received within longitudinal slots 136 adjacent the vertices of piston 42. FIG. 7A illustrates a low pressure condition in which bow seal 132 firmly contacts against the wall of housing 44. This is the condition that exists at relatively slow speeds of rotation and at no rotation.

FIG. 7B illustrates how spring bow sealing element 132 is deflected back against the vertices of piston 42 under relatively high speed and high pressure conditions of flow to bypass fluid between the vertices of piston 42 and the wall of housing 38. This minimizes the size of the inlet port. For example, one-half of the available flow from the pump is dissipated between the rotor tips and the housing. This reduces rotor tip and housing wear and also reduces the stress level in the rotor. Spring bow wipers 132, for example, may be arranged to deflect and bypass at a pressure of 500 p.s.i. and over. Sealing to the housing is required to effect tensioning of the pendant 16 by means of a reverse pressure flow back to the rotor as discussed in conjunction with FIG. 2 and in the following detailed description of operation.

The power of an illustrative energy absorber of this type is, for example, 62,5000 h.p., which would be capable of arresting a 125,000 pound airplane at 210 knots and 1000 ft. of line runout, within required operational capabilities. This would give such an aircraft arresting device an energy capacity of 241 million ft. pounds with a cable in a cable storage and payout system of the type described in the aforementioned copending application of 1 ½ inches diameter. The cable weight, for instance, would be 3,600 pounds per engine making it 50 percent of the lightest airplane to be arrested. The dynamic loads used with a nylon tape cable storage and payout system would also be minimal. Assuming a pressure in the pump of 3,000 p.s.i., the maximum flow would be 600 gallons per second or 26.5 gallons per shaft turn or 79.5 gallons per turn of the rotor. For a 16 inch deep rotor the diameter of the rotor would be 38 inches. With an allowable temperature rise of water at 40° F., the tub diameter would be approximately 8-½ storing 540 gallons. It is believed that outlet valves 46 need not be programmed, but if such becomes necessary, it can be accomplished to adjust to airplane weights ranging from 14,000—125,000 lbs.

Another important advantage of this invention is that it provides an energy absorber which is shallow enough to be mounted just under the deck of an aircraft carrier. This is also extremely important in view of the minimal space available abroad vessels.

During the arrest, the orifices in lines 66A and 66B permit pressure to be accumulated in storage cylinder 58 for retrieval and pendant tensioning. Valves 46A and 46B are opened by pressure through lines 76, 77, 79, 87A and 87B when retrieve valve 78 is opened. This minimizes the pressure necessary to operate retrieve motor 74. As shown in FIG. 2, orifice valve 85 allows main outlet valves 46A and 46B to close after retrieve control valve 78 is closed.

After retrieval, pendant 16 is tensioned by operating tensioning valve 82. This operates rotor 42 is a direction opposite to its rotation when absorbing energy and exerts a pull on the capstan side (not shown) of linear storage and payout system 34 when it is the type described in the aforementioned copending patent application and avoids the necessity of transmitting tensioning loads through motor 74, sprocket assembly 80 and the connected portions of the linear storage and payout system 34. Only a small displacement is needed to tension deck pendant 16, but some fluid will leak through the bearing. A makeup pump for the accumulator 84 is therefore required to restore the necessary pressure and one horsepower pump 138 is sufficient. During arrest, it is necessary to close the tensioner valve 82 and this is accomplished from energy absorber pressure through lines 70 and 71 to tension valve 82. Tensioning may also be accomplished by a jacking motor (not shown) connected directly to shaft 88 which eliminates the need for the illustrated reverse hydraulic and control connections to pump 38.

I claim:

1. An energy absorbing device comprising a container for fluid, a rotary pump within said container, said rotary pump comprising a casing and a rotor, said rotary pump having a pressure related characteristic, said pump having high- and low-pressure sections, outlet and inlet flow-conducting means respectively connecting said high- and low-pressure sections with said container whereby said fluid is circulated from said container through said pump and back into said container in response to rotation of said pump, and input rotating means connected to said pump for operating said pump in response to a mechanical input whereby energy is absorbed therefrom through the pressure response of said pump and transmitted to said fluid in said container in the form of heat.

2. A device as set forth in claim 1 wherein pressure control valves are installed in said outlet flow-conducting means for controlling said pressure related characteristic of said pump.

3. A device as set forth in claim 2 wherein said pressure control valves are of the pressure relief type.

4. A device as set forth in claim 3 wherein said pressure control valves are of the compressible fluid-actuated type.

5. A device as set forth in claim 2 wherein said pressure control valves are of program actuated type.

6. A device as set forth in claim 1 wherein pressure accumulator means is provided, pressure conduit means connects said container with said pressure accumulator means, cycling valve means in said pressure conduit means for causing pressure to be stored in said pressure accumulator means while said pump is being operated, and control means connected to said pressure conduit means for supplying fluid pressure to said pump in the reverse direction of operation of said pump.

7. A device as set forth in claim 1 wherein said rotary pump is of the rotary piston type.

8. A device as set forth in claim 7 wherein said rotor is mounted within a housing, sealing means between said rotor and said housing, and said sealing means being loose to minimize wear and stress.

9. A device as set forth in claim 8 wherein said sealing means has a variable effectiveness for providing a better seal during slow rotation of said rotor whereby the pressure response of said device is made more uniform over its cycle of operation.

10. A device as set forth in claim 9 wherein said variable sealing means comprises spring wiping means between said housing and said rotor which is constructed and arranged to deflect in response to conditions existing during higher rates of speed of said rotor whereby a flow between said rotor and said housing is caused during higher speeds of rotation of said rotor.

11. A device as set forth in claim 7 wherein said rotary piston-type pump includes a rotor and an input shaft, and said pump is characterized by having said rotor rotate at a speed less than the speed of said input shaft for minimizing the mass of said pump to provide a given amount of energy absorption.

12. An energy absorbing apparatus comprising the energy absorbing device as set forth in claim 1 and linear storage and payout means connected to said input rotating means of energy absorbing device for applying the mechanical energy to be absorbed in said device.

13. An apparatus as set forth in claim 1 wherein said rotary pump is of the rotary piston type.

14. An apparatus as set forth in claim 13 wherein said rotary piston-type pump includes a rotor and input shaft, said input shaft being connected to linear storage and payout means for applying said mechanical input to be absorbed by said device, and said pump is characterized by having said rotor rotate at a speed less than the speed of the said input shaft whereby the mass of said pump to provide a given energy absorption is minimized.

15. A device as set forth in claim 14 wherein said pump includes a housing, sealing means between said rotor and said housing and said sealing means having a variable effectiveness for providing a better seal during slow rotation of said rotor whereby the pressure response of said pump is made more uniform over its cycle of operation.

16. An energy absorbing device comprising a rotary piston pump having a pressure related characteristic, and input rotating means connected to said pump whereby said pump is caused to rotate in response to a mechanical input for absorbing the energy therefrom said rotary piston pump including a rotor and an input shaft, and said pump having means for rotating said rotor at a speed less than the speed of said input shaft for minimizing the mass of said pump to provide a given amount of energy absorption.

17. A device as set forth in claim 16 wherein pressure control valves are installed in said outlet flow-conducting means for controlling said pressure responsive characteristic of said pump.

18. A device as set forth in claim 17 wherein said pressure control valves are of the pressure relief type.

19. A device as set forth in claim 18 wherein said pressure control valves are of the compressible fluid-actuated type.

20. A device as set forth in claim 19 wherein said pressure control valves are of the compressed air actuated type.

PO-1050
(5/69)

UNITED STATES PATENT OFFICE
CERTIFICATE OF CORRECTION

Patent No. 3,549,110                        Dated December 22, 1970

Inventor(s) Robert B. Cotton

It is certified that error appears in the above-identified patent and that said Letters Patent are hereby corrected as shown below:

Column 5, line 4, change "62,5000" to -- 62,500 --

" " " 20, before "storing" insert -- ft. --

" " " 28, correct the spelling of "aboard"

" " " 38, change "is" to -- in --

Signed and sealed this 6th day of July 1971.

(SEAL)
Attest:

EDWARD M. FLETCHER, JR.                    WILLIAM E. SCHUYLER, JR
Attesting Officer                          Commissioner of Patents

Disclaimer 3,549,110.—*Robert B. Cotton*, Media, Pa. ENERGY ABSORBER. Patent dated Dec. 22, 1970. Disclaimer filed Aug. 18, 1971, by the assignee, *All American Engineering Company*.

Hereby enters this disclaimer to claims 1–6 of said patent.

[*Official Gazette October 26, 1971.*]